United States Patent
Kwon et al.

(10) Patent No.: US 8,970,543 B2
(45) Date of Patent: Mar. 3, 2015

(54) TOUCH SENSING APPARATUS AND METHOD THEREOF

(75) Inventors: Yong Il Kwon, Gyunggi-do (KR); Sang Ho Lee, Gyunggi-do (KR); Gyung Hee Hong, Seoul (KR); Tah Joon Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 254 days.

(21) Appl. No.: 13/359,610

(22) Filed: Jan. 27, 2012

(65) Prior Publication Data

US 2013/0127773 A1 May 23, 2013

(30) Foreign Application Priority Data

Nov. 21, 2011 (KR) ........................ 10-2011-0121830

(51) Int. Cl.
*G06F 3/045* (2006.01)
*G06F 3/041* (2006.01)
*G06F 3/044* (2006.01)

(52) U.S. Cl.
CPC .............. *G06F 3/0416* (2013.01); *G06F 3/044* (2013.01)
USPC ........................................................ 345/174

(58) Field of Classification Search
CPC combination set(s) only.
See application file for complete search history.

(56) References Cited

U.S. PATENT DOCUMENTS

| 7,986,193 | B2 | 7/2011 | Krah | |
|---|---|---|---|---|
| 2008/0158145 | A1 | 7/2008 | Westerman | |
| 2008/0309628 | A1 | 12/2008 | Krah et al. | |
| 2009/0284492 | A1* | 11/2009 | Chino | 345/174 |
| 2010/0134438 | A1 | 6/2010 | Yu et al. | |
| 2012/0182256 | A1* | 7/2012 | Kitada | 345/174 |
| 2013/0241873 | A1* | 9/2013 | Kim et al. | 345/174 |

FOREIGN PATENT DOCUMENTS

| KR | 10-2010-0038590 | 4/2010 |
|---|---|---|
| KR | 10-2010-0062217 | 6/2010 |
| KR | 10-2011-0061798 | 6/2011 |

OTHER PUBLICATIONS

Korean Office Action issued Jun. 27, 2013 in corresponding Korean Application No. 10-2011-0121830.

* cited by examiner

Primary Examiner — Van Chow (57) ABSTRACT

There are provided a touch sensing apparatus and a touch sensing method. The touch sensing apparatus includes a driving circuit unit applying a driving signal to at least one of a plurality of first electrodes; a sensing circuit unit generating an analog signal by detecting variations in capacitance in second electrodes intersecting the at least one of first electrodes to which the driving signal is applied; and a signal converting unit converting the analog signal into a digital signal, wherein the driving circuit unit controls a frequency of the driving signal according to electric noise and determines a level of the driving signal according to a dynamic range of the signal converting unit.

11 Claims, 6 Drawing Sheets

TOUCH SENSING APPARATUS AND METHOD THEREOF

CROSS-REFERENCE TO RELATED APPLICATIONS

This application claims the priority of Korean Patent Application No. 10-2011-0121830 filed on Nov. 21, 2011, in the Korean Intellectual Property Office, the disclosure of which is incorporated herein by reference.

BACKGROUND OF THE INVENTION

1. Field of the Invention

The present invention relates to a touch sensing apparatus and a method thereof that can minimize the influence of noise and ensure a stable operation by controlling a dynamic range of a signal converting unit according to a frequency and a signal level of a driving signal applied to an electrode.

2. Description of the Related Art

Touch sensing apparatuses such as a touch screen, a touch pad, and the like, as user interface apparatuses attached to a display apparatus to provide an intuitive input method to a user, have been widely applied to a variety of electronic apparatuses such as a cellular phone, a personal digital assistant (PDA), a navigation device and the like, in recent years. In particular, recently, with the increase in demand for smart phones, the rate at which a touch screen has been adopted as a touch sensing apparatus capable of providing various input methods in a limited form factor has increased on a daily basis.

Touch screens adopted in portable electronic apparatuses may be largely classified into resistive type and capacitive type touch screens, according to a touch sensing method. Since the capacitive type touch screen is advantageous in that a life-span thereof may be relatively extended, and various input methods and gestures can be easily implemented therein, the adoption rate of the capacitive type touch screen has steadily increased. In particular, it is easier to implement a multi-touch interface in the capacitive type touch screen than in the resistive type touch screen, and as a result, the capacitive type touch screen is widely applied to an electronic apparatus such as a smart phone, or the like.

Touch screens are generally attached to a front surface of the display apparatus, while touch sensing apparatuses other than touch screens are also generally provided within the electronic apparatus. Accordingly, touch sensing accuracy may be deteriorated due to noise generated in various electronic components, e.g., a wireless communication unit, the display apparatus, and a power supply device, provided together in the electronic apparatus. In order to solve this problem, a frequency hopping method of changing a frequency of a driving electrode applied to an electrode of the touch screen according to noise generated from the outside may be adopted. However, in this case, a touch sensing error depending on an operational dynamic range of a circuit generating a digital signal through frequency conversion may occur.

SUMMARY OF THE INVENTION

An aspect of the present invention provides a touch sensing apparatus and a method thereof that can accurately detect a touch within a dynamic range of a circuit generating a digital signal, by controlling a signal level of a driving signal in addition to controlling a frequency of the driving signal, according to electric noise generated from the outside.

According to an aspect of the present invention, there is provided a touch sensing apparatus including: a driving circuit unit applying a driving signal to at least one of a plurality of first electrodes; a sensing circuit unit generating an analog signal by detecting variations in capacitance in second electrodes intersecting the at least one of first electrodes to which the driving signal is applied; and a signal converting unit converting the analog signal into a digital signal, wherein the driving circuit unit controls a frequency of the driving signal according to electric noise and determines a level of the driving signal according to a dynamic range of the signal converting unit.

The driving circuit unit may apply the driving signal to the plurality of first electrodes as a current signal and controls a level of the current signal according to the electric noise.

The driving circuit unit may include a current mirror circuit for controlling the level of the current signal.

The touch sensing apparatus may further include a comparison circuit unit comparing a level of the analog signal input into the signal converting unit with a predetermined reference signal level.

The reference signal level may include a maximum signal level and a minimum signal level to determine the dynamic range of the signal converting unit.

The driving circuit unit may control at least one of the frequency of the driving signal and the level of the driving signal according to output of the comparison circuit unit.

The sensing circuit unit may detect variations in mutual-capacitance in the second electrodes intersecting the at least one of first electrodes to which the driving signal is applied.

The driving circuit unit, the sensing circuit unit, and the signal converting unit may be configured as an integrated circuit.

According to another aspect of the present invention, there is provided a touch sensing method, including: applying a driving signal to at least one of a plurality of first electrodes; generating an analog signal by detecting variations in capacitance in second electrodes intersecting the at least one of first electrodes to which the driving signal is applied; and converting the analog signal into a digital signal, wherein a frequency of the driving signal and a level of the driving signal are determined by comparing a level of the analog signal with a predetermined reference signal level.

The converting of the analog signal into the digital signal may include setting parameters accroding to the frequency of the driving signal and the level of the driving signal.

The touch sensing method may further include determining a touch by using the digital signal.

The generating of the analog signal may include detecting variations in mutual-capacitance in the second electrodes intersecting the at least one of first electrodes to which the driving signal is applied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will be described in detail with reference to the accompanying drawings. These embodiments will be described in detail in order to allow those skilled in the art to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and scope of the present invention. In addition, it should be understood that positions and arrangements of individual components in each embodiment may be changed without departing from the spirit and scope of the present invention. Therefore, a detailed description provided below should not be construed as being restrictive. In addition, the scope of the present invention is defined only by the accompanying claims and their equivalents if appropriate. Similar reference numerals will be used to describe the same or similar functions throughout the accompanying drawing.

Hereinafter, embodiments of the present invention will be described in detail with reference to the accompanying drawings so that those skilled in the art may easily practice the present invention.

Figure 1:
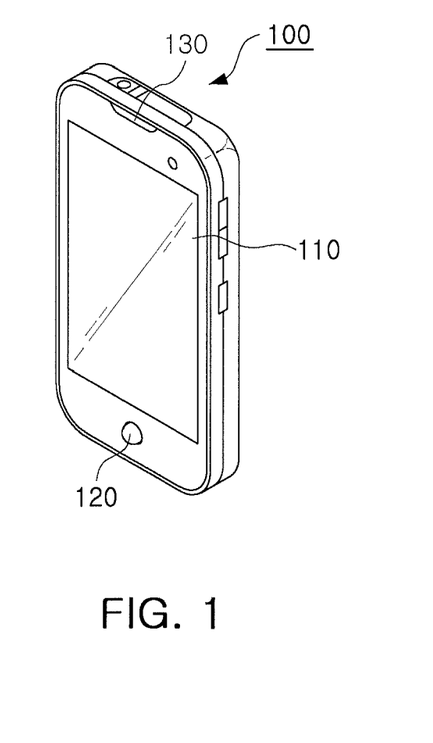
FIG. 1 is a perspective view illustrating an exterior of an electronic apparatus having a touch sensing apparatus according to an embodiment of the present invention.

FIG. 1 is a view showing an electronic apparatus to which a touch sensing apparatus according to an embodiment of the present invention is applicable. Referring to FIG. 1, an electronic apparatus 100 according to the present embodiment includes a display apparatus 110 for outputting an image, an input unit 120, an audio unit 130 for outputting audio, and a touch sensing apparatus integrated with the display apparatus 110.

As shown in FIG. 1, in the case of a mobile apparatus, the touch sensing apparatus is generally provided integrally with the display apparatus and needs to have high light transmittance enough to transmit the image displayed by the display apparatus. Therefore, the touch sensing apparatus may be implemented by forming a sensing electrode using a transparent and electrically conductive material such as indium-tin oxide (ITO), indium zinc oxide (IZO), zinc oxide (ZnO), carbon nano tube (CNT), or graphene, on a base substrate formed of a transparent film material such as polyethylene terephthalate (PET), polycarbonate (PC), polyethersulfone (PES), polyimide (PI), or the like. The display apparatus may include a wiring pattern disposed in a bezel area thereof, and the wiring pattern is connected to the sensing electrode formed of the transparent conductive material. Since the wiring pattern is visually shielded by the bezel area, the wiring pattern may be formed of a metallic material such as silver (Ag), copper (Cu), or the like.

In the case in which the touch sensing apparatus according to the embodiment of the present invention may not be provided integrally with the display apparatus like in a touch pad of a notebook computer, the touch sensing apparatus may be manufactured by simply patterning the sensing electrode on a circuit substrate with metal. However, for convenience of explanation, the touch sensing apparatus and method according to the embodiment of the present invention will be described based on the touch screen.

Figure 2:
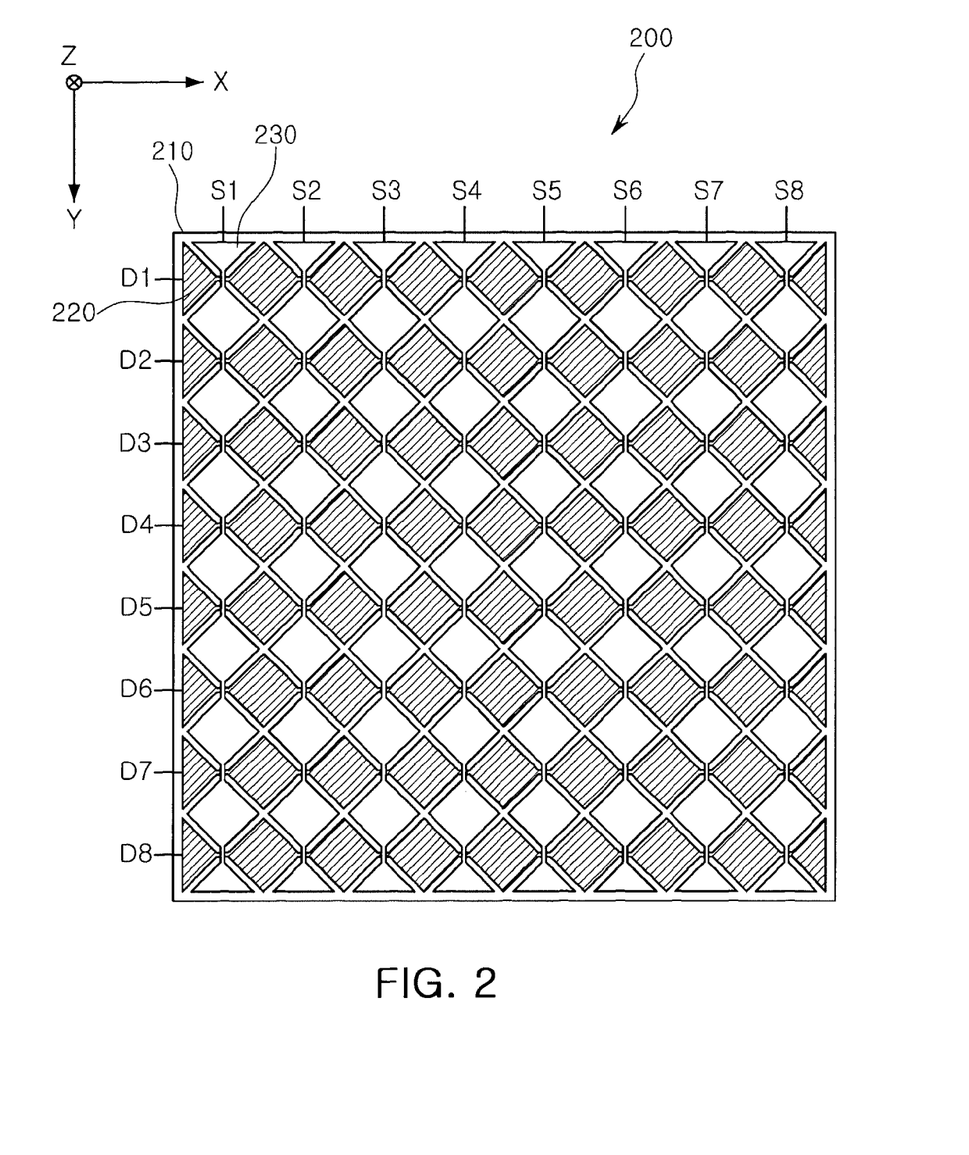
FIG. 2 is a plan view illustrating a touch sensing panel electrically connected to a touch sensing apparatus according to an embodiment of the present invention.

FIG. 2 is a plan view showing a touch sensing panel electrically connected to a touch sensing apparatus according to an embodiment of the present invention.

Referring to FIG. 2, a touch sensing panel 200 according to this embodiment includes a substrate 210 and a plurality of sensing electrodes 220 and 230 provided on the substrate 210. Although not shown in FIG. 2, each of the plurality of sensing electrodes 220 and 230 may be electrically connected to the wiring pattern of the circuit board attached to one end of the substrate 210 through a wire and a bonding pad. A controller integrated circuit is mounted on the circuit board to detect sensed signals generated from the plurality of sensing electrodes 220 and 230 and determine the touch based thereon.

In the touch screen apparatus, the substrate 210 may be a transparent substrate in which the sensing electrodes 220 and 230 may be formed, and may be formed of a plastic material such as polyimide (PI), polymethylmethacrylate (PMMA), polyethyleneterephthalate (PET), or polycarbonate (PC) or tempered glass. Further, apart from an area in which the sensing electrodes 220 and 230 are formed, a predetermined printing area for the wire connected to the sensing electrodes 220 and 230 may be formed on the substrate 210 in order to visually shield the wire formed of an opaque metallic material.

The plurality of sensing electrodes 220 and 230 may be provided on one surface or both surfaces of the substrate 210. In the case of the touch screen apparatus, the plurality of sensing electrodes 220 and 230 may be formed of a transparent conductive material such as indium-tin oxide (ITO), indium zinc-oxide (IZO), zinc oxide (ZnO), carbon nano tube (CNT), or grapheme based material. Although the sensing electrodes 220 and 230 having a rhombus or diamond-shaped pattern are shown in FIG. 2, the sensing electrodes 220 and 230 may have various patterns using polygonal shapes such as a rectangle, a triangle, and the like.

The plurality of sensing electrodes 220 and 230 include first electrodes 220 extending in an X-axis direction and second electrodes 230 extending in a Y-axis direction. The first electrodes 220 and the second electrodes 230 may be provided on both surfaces of the substrate 210 or provided on different substrates to intersect each other. In the case in which both the first and second electrodes 220 and 230 are provided on one surface of the substrate 210, a predetermined insulating layer may be partially formed at an intersecting point between the first and second electrodes 220 and 230.

A touch sensing apparatus that is electrically connected to the plurality of sensing electrodes 220 and 230 to sense a touch detects capacitive variations sensed in the plurality of sensing electrodes 220 and 230 and senses the touch therefrom. The first electrodes 220 are connected to channels defined as D1 to D8 in the controller integrated circuit to receive predetermined driving signals, and the second electrodes 230 are connected to channels defined as S1 to S8 to be used in order for the controller integrated circuit to detect sensed signals. In this case, the controller integrated circuit may detect mutual-capacitance variations generated between the first and second electrodes 220 and 230 as the sensed signals, and may sequentially apply the driving signals to the individual first electrodes 220 and simultaneously detect capacitance variations in the second electrodes 230.

Figure 3:
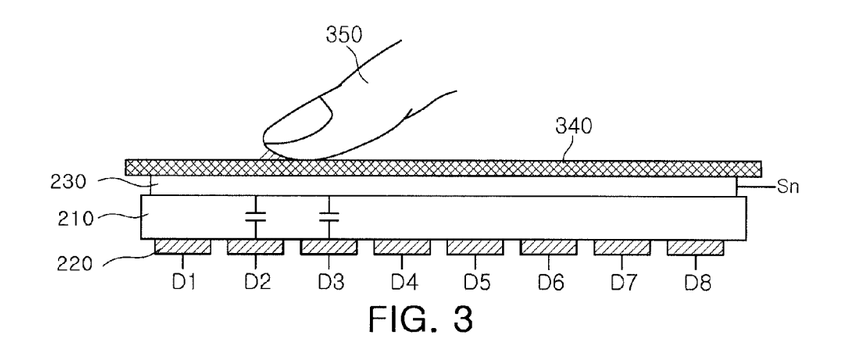
FIG. 3 is a cross-sectional view of the touch sensing panel shown in FIG. 2.

FIG. 3 is a cross-sectional view of the touch sensing panel shown in FIG. 2.

FIG. 3 is a cross-sectional view of the touch sensing panel 200 shown in FIG. 2 taken in a Y-Z direction. The touch sensing panel 200 may further include a cover lens 340 receiving the touch, in addition to the substrate 210 and the plurality of sensing electrodes 220 and 230 described in FIG. 2. The cover lens 340 is provided on the second electrodes 330 used to detect the sensed signals such that it may receive the touch from a touching object 350 such as a finger.

When the driving signals are sequentially applied to the first electrodes 220 through the channels D1 to D8, mutual-capacitance is generated between the first and second electrodes 220 and 230. When the driving signals are sequentially applied to the first electrodes 220, a capacitance variation may occur between the first and second electrodes 220 and 230 adjacent to an area contacted by the touching object 350. The capacitance variation may be proportionate to a dimension of an area overlapped among the touching object 350, the first electrodes 220 applied with the driving signals and the second electrodes 230. In FIG. 3, the mutual-capacitance generated between the first and second electrodes 220 and 230 connected to the channels D2 and D3 is influenced by the touching object 350.

Figure 4:
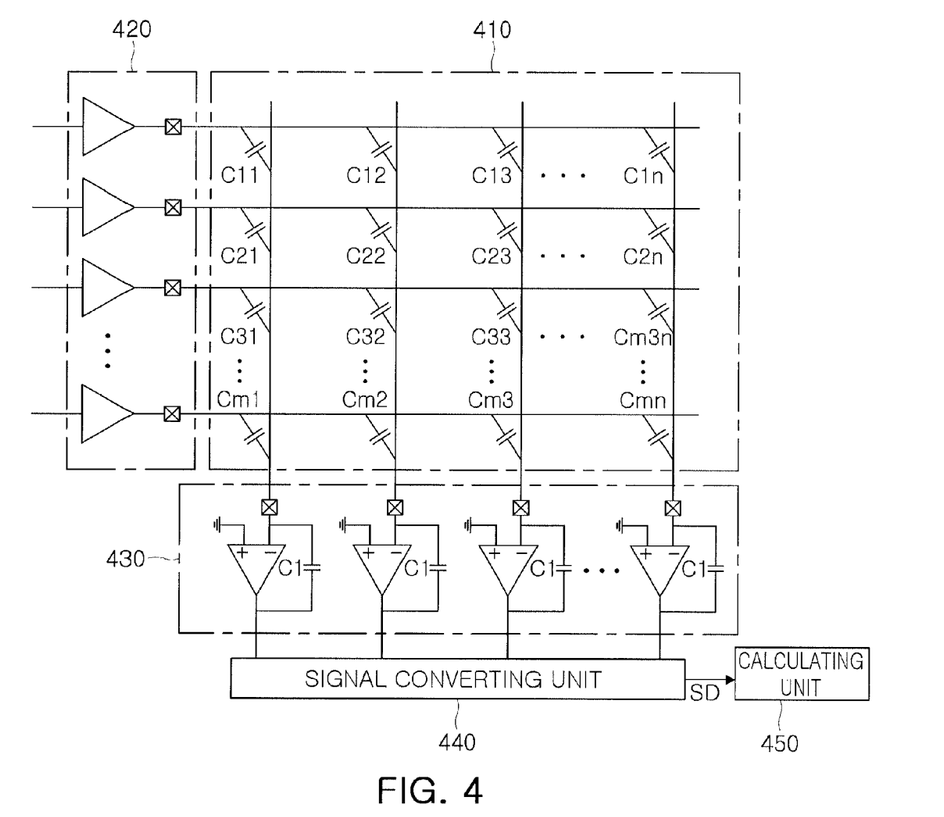
FIG. 4 is a block diagram of a touch sensing apparatus according to an embodiment of the present invention.

FIG. 4 is a block diagram of a touch sensing apparatus according to an embodiment of the present invention.

Referring to FIG. 4, a touch sensing apparatus according to the present embodiment includes a panel unit 410, a driving circuit unit 420, a sensing circuit unit 430, a signal converting unit 440, and a calculating unit 450. The panel unit 410 includes a plurality of first electrodes extending in a first axis direction (a horizontal direction of FIG. 4) and a plurality of second electrodes extending in a second axis direction intersecting the first axis direction (a vertical direction of FIG. 4). Variations in capacitance C11 to Cmn are generated at intersecting points between the first and second electrodes. The variations in capacitance C11 to Cmn generated at the intersecting points of the first and second electrodes may be variations in mutual-capacitance generated by driving signals applied to the first electrodes by the driving circuit unit 420. Meanwhile, the driving circuit unit 420, the sensing circuit unit 430, the signal converting unit 440, and the calculating unit 450 may be configured as an integrated circuit (IC).

The driving circuit unit 420 applies predetermined driving signals the first electrodes of the panel unit 410. The driving signals may have a square wave, a sine wave, a triangle wave, and the like having a predetermined cycle and a predetermined amplitude. The driving signals may be sequentially applied to the plurality of first electrodes, respectively. As shown in FIG. 4, the circuits for generating and applying the driving signals to the first electrodes are individually connected to the plurality of respective first electrodes. However, a single driving signal generating circuit may be used together with a switching circuit such that it may apply the driving signals to the plurality of first electrodes through the switching circuit.

The sensing circuit unit 430 may include integral circuits for sensing the variations in capacitance C11 to Cmn in the second electrodes. The integral circuit may include at least one operational amplifier and a capacitor C1 having a predetermined capacitance. An inversion input terminal of the operational amplifier is connected to the second electrode to convert the variations in capacitance C11 to Cmn to analog signals such as voltage signals and output the signals. When the driving signals are sequentially applied to the plurality of first electrodes, respectively, the variations in capacitance may be simultaneously detected in the plurality of second electrodes, and thus, the number of integral circuits may correspond to the number (m) of the second electrodes.

The signal converting unit 440 generates a digital signal $S_D$ from the analog signal generated by the integral circuit. For example, the signal converting unit 440 may include a time-to-digital converter (TDC) circuit measuring a time required for a voltage type analog signal outputted from the sensing circuit unit 430 to reach a predetermined reference voltage level and converting the measured time into a digital signal $S_D$, or an analog-to-digital converter (ADC) circuit measuring a variation in a level of an analog signal outputted from the sensing circuit unit 430 for a predetermined time and converting the measured variation into a digital signal $S_D$. The calculating unit 450 determines the touch applied to the panel unit 410 by using the digital signal $S_D$. For example, the calculating unit 450 may determine the number of touches applied to the panel unit 410, coordinates of the touch, movements during the touch, and the like.

In general, the panel unit 410 is integrally provided in the upper part of the display apparatus, and as a result, the panel unit 410 is influenced by electric noise generated from the display apparatus. On the assumption that the touch sensing apparatus of FIG. 4 is applied to a mobile electronic apparatus, the display apparatus may be generally assumed as an LCD or an OLED. A flat panel display apparatus such as an LCD or an OLED has a lattice structure intersecting in horizontal and vertical directions and may include a gate driver circuit and a data driver circuit for applying signals to implement an image in pixels present at intersections. In this case, a driving signal of the display apparatus has a predetermined cycle and a predetermined amplitude similar to that of a driving signal of the touch sensing apparatus. Electric noise generated while the driving signal of the display apparatus is applied to each pixel of the display apparatus may have a bad influence on the performance of the touch sensing apparatus.

In general, in order to minimize the influence of noise on the touch sensing apparatus, a shielding layer electrically grounded may be added between the display apparatus and the touch sensing apparatus. However, the shielding layer may increase the thicknesses of the touch sensing apparatus and the mobile apparatus and deteriorate overall light transmittance.

Therefore, in the embodiment of the present invention, in order to minimize the influence of noise generated from an RF communication module, a power supply apparatus, and the like as well as the display apparatus, the frequency of the driving signal applied to the first electrode from the driving circuit unit 420 may be controlled. A change in the frequency of the driving signal may affect the generation of an analog signal, e.g., a voltage signal by integrating variations in capacitance in the integral circuit of the sensing circuit unit 430. For example, when the frequency of the driving signal increases, a slope of the voltage signal may increase when the voltage signal is generated by integrating the variations in capacitance in the integral circuit. When the frequency of the driving signal decreases, the slope of the voltage signal may decrease.

When the signal converting unit 440 is the ADC circuit generating a digital signal $S_D$ by measuring a voltage variation amount for a predetermined time, it may be difficult to accurately generate the digital signal due to a difference in the variation amount of the analog signal according to the frequency of the driving signal. That is, when the analog signal is rapidly varied due to an increase in the frequency of the driving signal, the analog signal value may be measured to be excessively high after a reference time elapses. On the contrary, when the analog signal is excessively slowly varied due to a decrease in the frequency of the driving signal, the analog signal value is measured to be excessively low after a reference time elapses, and as a result, it may be determined that the touch is not generated. Accordingly, in order to correct it, the voltage variation amount may be controlled to be within the dynamic range of the signal converting unit 440 by controlling the level of the driving signal as well as the frequency of the driving signal.

Figure 5:
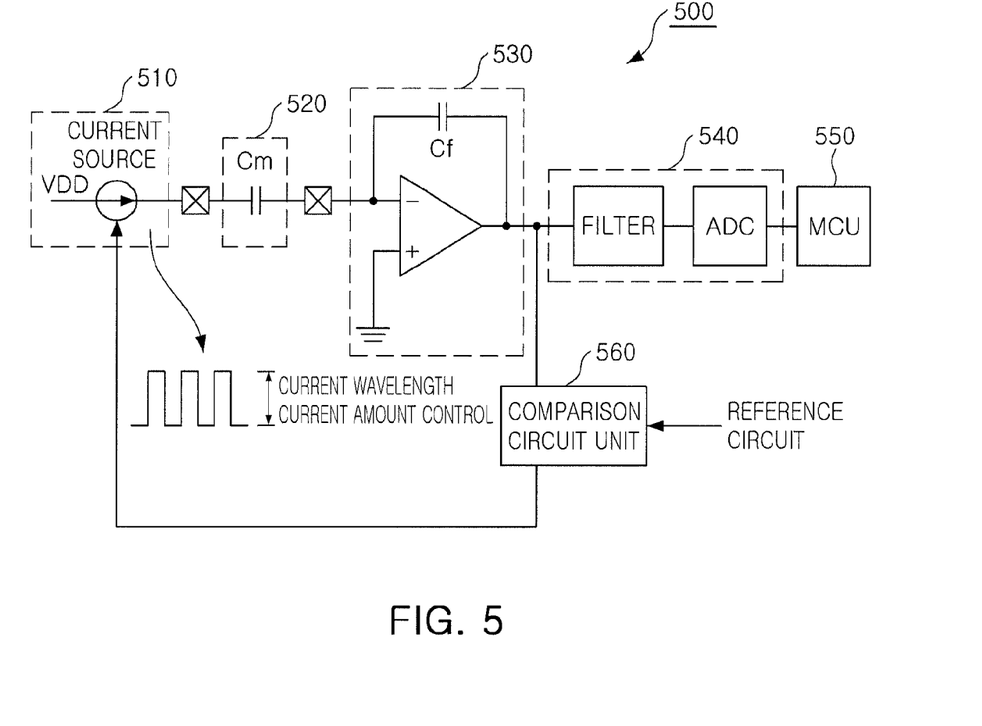
FIGS. 5 and 6 are circuit diagrams illustrating the detailed configuration of a touch sensing apparatus according to an embodiment of the present invention.
Figure 6:
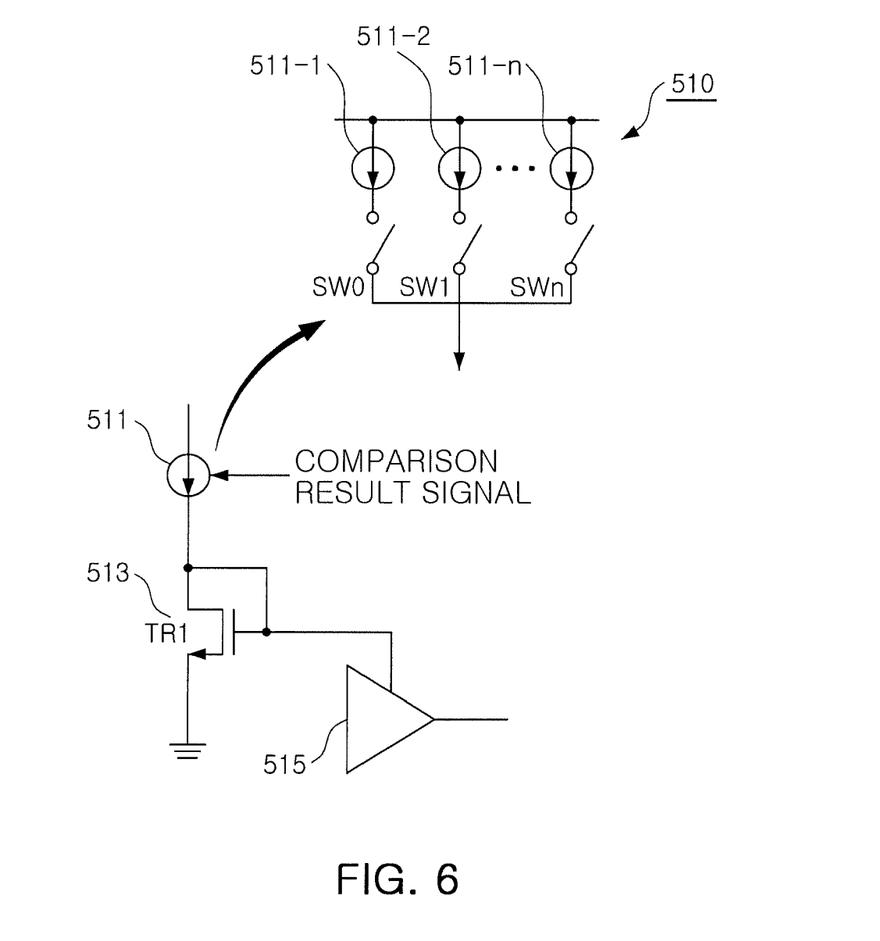

FIGS. 5 and 6 are circuit diagrams provided to describe the detailed configuration of a touch sensing apparatus according to an embodiment of the present invention.

Referring to FIG. 5, a touch sensing apparatus 500 according to the present embodiment includes a driving circuit unit 510, a sensor unit 520, a sensing circuit unit 530, a signal converting unit 540, a calculating unit 550, and a comparison circuit unit 560. The sensor unit 520 is schematically illustrated as a variation in mutual-capacitance generated in electrodes provided in a panel unit of the touch sensing apparatus 500. The magnitude of a variation in capacitance Cm generated in the sensor unit may be proportionate to an area of the touch. Switching elements placed at both front and rear ends of the sensor unit 520 allow for the selective application of the driving signal to an electrode of the panel unit, the connection to the sensing circuit unit 530, and the detection of the variation in capacitance.

The driving circuit unit 510 includes a current source, and the level of current output to the sensor unit 520 from the current source may be controlled by a power supply voltage Vdd. The driving circuit unit 510 may include a current mirror circuit and a switching element such as a transistor, in order to control the current signal level according to a signal output from the comparison circuit unit 560. The configuration of the driving circuit unit 510 will be described with reference to FIG. 6.

FIG. 6 is a circuit diagram showing the driving circuit unit 510 shown in FIG. 5 in more detail. Referring to FIG. 6, the driving circuit unit 510 included in the touch sensing apparatus 500 according to this embodiment includes a current supplying portion 511 including a plurality of current sources 511-1 to 511-n and switches SW1 to SWn, a switching element 513, and a driving portion 515. The current signal level output from the current supplying portion 511 may be determined by a comparison result signal output from the comparison circuit unit 560 of the touch sensing apparatus 500. That is, on/off of the switches SW1 to SWN may be determined according to the comparison result signal output from the comparison circuit unit 560.

The output signal of the current supplying portion 511 is input into the driving portion 515 to control the level of the driving signal applied to the sensor unit 520. As described above, the signal converting unit 540 may generate the digital signal from the voltage variation amount which increases for a predetermined reference time at the time of generating the digital signal, and when the frequency of the driving signal increases, the slope of the voltage variation amount increases. The voltage variation amount applied to the generation of the digital signal of the signal converting unit 540 is expressed by an equation associated with the time.

$$\text{Voltage Variation Amount} = \frac{Cm}{Cf} * V_{DD} * \frac{1}{T} * \text{Time} \quad \text{[Equation 1]}$$

That is, the slope of the voltage variation amount depending on the time is determined according to a voltage $V_{DD}$ for operating the driving portion 515 or corresponding to the level of the driving signal, and 1/T, the frequency of the driving signal. Therefore, since the slope increases as the frequency increases, voltage may be measured to be excessively high at a reference time at which the voltage variation amount is measured. On the contrary, since the slope decreases as the frequency decreases, voltage may be measured to be excessively low at a reference time at which the voltage variation amount is measured.

In the present embodiment, in order to minimize the above-mentioned influence through the frequency hopping of the driving signal for minimizing the influence of noise, the voltage variation amount measured at the reference time is controlled to be continuously within the dynamic range of the signal converting unit 540, in spite of the frequency hopping, by controlling voltage $V_{DD}$ for operating the driving portion 515 or corresponding to the level of the driving signal. Hereinafter, the operation of the touch sensing apparatus according to the embodiment of the present invention will be described with reference to FIG. 5 again.

When the driving signal generated in the driving circuit unit 510 is applied to the sensor unit 520 and the variation in capacitance Cm is generated due to the occurrence of the touch, the integral circuit of the sensing circuit unit 530 detects the variation in capacitance Cm. The integral circuit integrates the variation in capacitance Cm to output a predetermined analog signal, i.e., a voltage signal. The voltage signal output by the integral circuit is input into the signal converting unit 540. The signal converting unit 540 may include a filter for removing noise of the voltage signal and an ADC circuit for generating the digital signal.

Meanwhile, the comparison circuit unit 560 may be connected to a node between the sensing circuit unit 530 and the signal converting unit 540. The comparison circuit unit 560 compares the level of the voltage signal output from the sensing circuit unit 530 with a predetermined reference signal level to transfer the comparison result signal to the driving circuit unit 510. For example, a reference voltage received by the comparison circuit unit 560 may be equal to an upper limit or lower limit signal level to determine the dynamic range of the ADC circuit of the signal converting unit 540.

When it is determined that the level of the voltage signal output from the sensing circuit unit 530 is higher than the upper limit level of the dynamic range of the ADC circuit, the comparison result signal is generated to decrease the voltage $V_{DD}$ for operating the driving portion 515 or corresponding to the level of the driving signal. On the contrary, when it is determined that the level of the voltage signal output from the sensing circuit unit 530 is lower than the lower limit level of the dynamic range of the ADC circuit, the comparison result signal is generated to increase the voltage $V_{DD}$ for operating the driving portion 515 or corresponding to the level of the driving signal. As a result, stable signal conversion of the ADC circuit may be ensured while using the frequency hopping.

Figure 7:
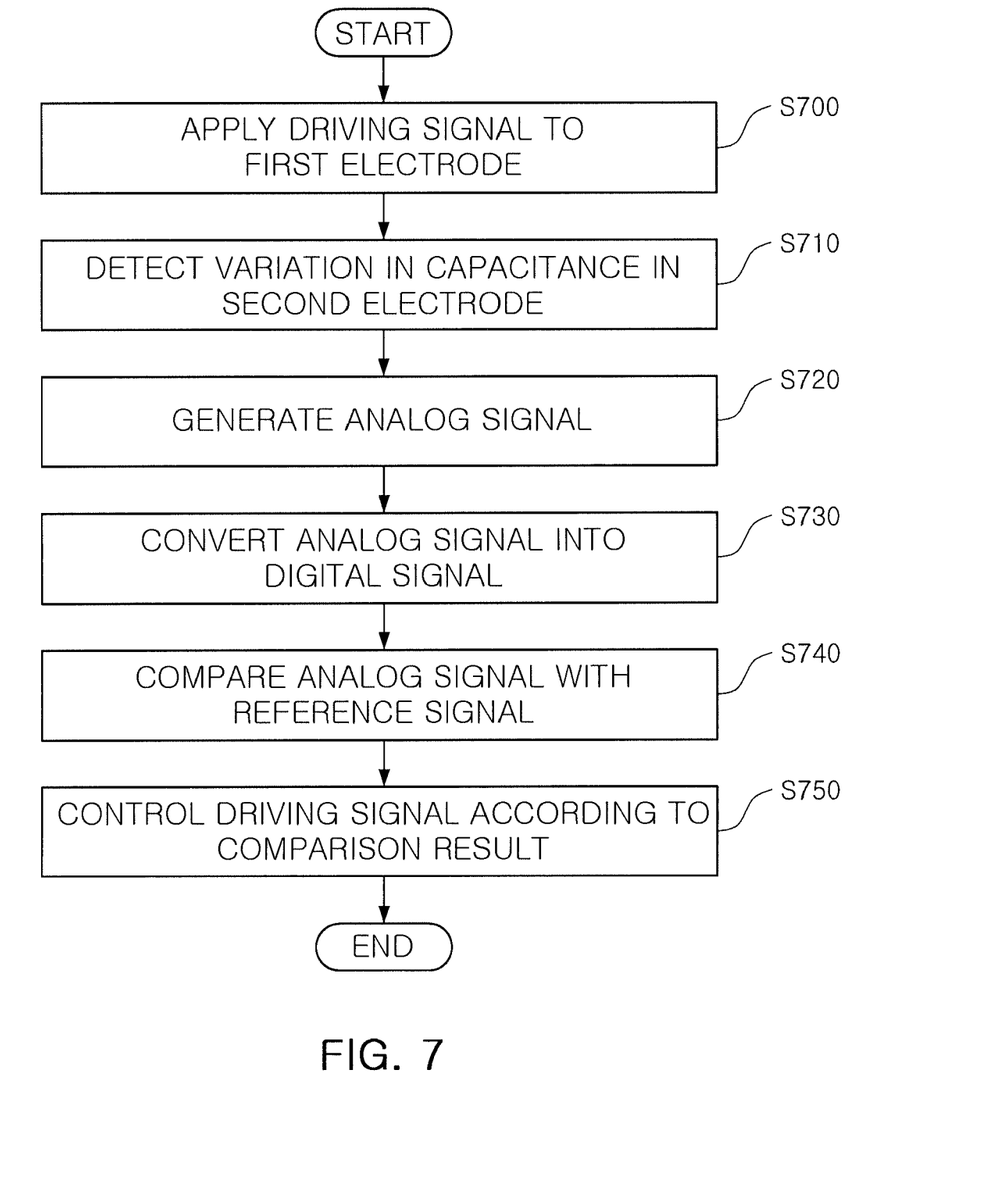
FIG. 7 is a flowchart illustrating a touch sensing method according to an embodiment of the present invention.

FIG. 7 is a flowchart illustrating a touch sensing method according to an embodiment of the present invention.

Referring to FIG. 7, a touch sensing method according to an embodiment of the present invention is initiated with applying driving signals to the first electrodes of the panel unit 410 (S700). As shown in FIGS. 2 to 4, the first electrodes extending in the first axial direction may be electrically separated from each other and may sequentially receive the driving signals from the driving circuit unit 420. The driving circuit unit 420 may change frequencies of the driving signals applied to the first electrodes depending on noise generated in the outside.

The sensing circuit unit 430 detects variations in capacitance in the second electrodes (S710) and generates analog signals therefrom (S720). As shown in FIGS. 4 and 5, the sensing circuit unit 430 may include integral circuits and the integral circuits may generate and output voltage signals by integrating the variations in capacitance generated in the second electrodes, that is, variations in the mutual-capacitance as an example. The voltage signals output from the sensing circuit unit 430 are input into the signal converting unit 440.

The signal converting unit 440 converts the voltage signals into digital signals (S730). The signal converting unit 440 may include a digital signal generation circuit such as an ADC circuit or a TDC circuit, and the digital signals generated by the signal converting unit 440 are input into the calculating unit 450 to be used to determine a touch. As described above, the calculating unit 450 may determine the number of touches, the position of the touch, and movements during the touch, and the like by using the digital signals.

Meanwhile, the analog signals input into the signal converting unit 440 are input into the comparison circuit unit, and the comparison circuit unit compares the levels of the analog signals with a predetermined reference signal level (S740). The comparison results are transferred to the driving circuit unit 420 to be used to control the levels of the driving signals applied to the first electrodes (S750).

Since a voltage variation amount measured by the signal converting unit 440 at a reference time may deviate from the dynamic range of the signal converting unit 440 according to an increase or a decrease in frequencies of the driving signals, the driving circuit unit 420 controls the levels of the driving signals according to the comparison results of the comparison circuit unit so that the voltage variation amount is included within the dynamic range of the signal converting unit 440. From the above configuration, the frequencies of the driving signals may be controlled to minimize the influence of external noise by applying frequency hopping due to external noise to the touch sensing apparatus, and the voltage variation amount may also be prevented from deviating from the dynamic range of the signal converting unit 440, through frequency hopping.

As set forth above, according to embodiments of the present invention, a touch can be accurately detected within a dynamic range of a digital signal generating circuit by controlling a level of a driving signal according to a level of an analog signal input into the digital signal generating circuit while a frequency of the driving signal applied to an electrode is differently set according to noise generated from the outside. Accordingly, the touch can be accurately determined by minimizing the influence of noise generated in a display apparatus without an additional shielding layer.

While the present invention has been shown and described in connection with the embodiments, it will be apparent to those skilled in the art that modifications and variations can be made without departing from the spirit and scope of the invention as defined by the appended claims.

What is claimed is:

1. A touch sensing apparatus, comprising:
a driving circuit unit applying a driving signal to at least one of a plurality of first electrodes;
a sensing circuit unit generating an analog signal by detecting variations in capacitance in second electrodes intersecting the at least one of the first electrodes to which the driving signal is applied;
a signal converting unit converting the analog signal into a digital signal; and
a comparison circuit unit comparing a level of the analog signal input into the signal converting unit with an upper limit signal level and a lower limit signal level to determine a dynamic range of the signal converting unit, generating a comparison result signal to decrease a level of the driving signal if the level of the analog signal is higher than the upper limit signal level of the dynamic range of the signal converting unit, and generating the comparison result signal to increase the level of the driving signal if the level of the analog signal is lower than the lower limit signal level of the dynamic range of the signal converting unit, and
the driving circuit unit controlling a frequency of the driving signal according to electric noise and controlling the level of the driving signal according to the comparison result signal from the comparison circuit unit.

2. The touch sensing appartus of claim 1, wherein the driving circuit unit applies the driving signal to the plurlaity of first electrodes as a current signal and controls a level of the current signal according to the electric noise.

3. The touch sensing appartus of claim 2, wherein the driving circuit unit includes a curent mirror circuit for controlling the level of the current signal.

4. The touch sensing appartus of claim 1, wherein the driving circuit unit controls at least one of the frequency of the driving signal and the level of the driving signal accoridng to output of the comparision circuit unit.

5. The touch sensing appartus of claim 1, wherein the sensing circuit unit detects variations in mutual-capacitance in the second electrodes intersecting the at least one of first electrodes to which the driving signal is applied.

6. The touch sensing appartus of claim 1, wherein the driving circuit unit, the sensing circuit unit, and the signal converting unit are configured as an integrated circuit.

7. A touch sensing method, comprising:
changing a frequency of a driving signal according to a noise generated outside;
applying the driving signal to at least one of a plurality of first electrodes;
generating an analog signal by detecting variations in capacitance in second electrodes intersecting the at least one of the first electrodes to which the driving signal is applied; and
converting the analog signal into a digital signal,
wherein a level of the driving signal is controlled by comparing a level of the analog signal with a dynamic range of the converted analog signal that is converted into the digital signal.

8. The touch sensing method of claim 7, wherien the converting of the analog signal into the digital signal includes setting parameters accroding to the frequency of the driving signal and the level of the driving signal.

9. The touch sensing method of claim 7, further comprising determining a touch by using the digital signal.

10. The touch sensing method of claim 7, wherien the geneating of the analog signal includes detecting variations in mutual-capacitance in the second electrodes intersecting the at least one of first electrodes to which the driving signal is applied.

11. The touch sensing method of claim 7, wherein the dynamic range is a range between an upper limit signal level and a lower limit signal level of the analog signal.

* * * * *

UNITED STATES PATENT AND TRADEMARK OFFICE
CERTIFICATE OF CORRECTION

PATENT NO.        : 8,970,543 B2                                    Page 1 of 1
APPLICATION NO.   : 13/359610
DATED             : March 3, 2015
INVENTOR(S)       : Yong Il Kwon et al.

It is certified that error appears in the above-identified patent and that said Letters Patent is hereby corrected as shown below:

On the Title Page, Column 1, Item (75) (Inventors)
Delete "Yong II Kwon," and insert --Yong Il Kwon,--, therefor.

In the Claims
Column 10, Line 15, delete "appartus" and insert --apparatus--, therefor.
Column 10, Line 16, delete "plurlaity" and insert --plurality--, therefor.
Column 10, Line 19, delete "appartus" and insert --apparatus--, therefor.
Column 10, Line 20, delete "curent" and insert --current--, therefor.
Column 10, Line 22, delete "appartus" and insert --apparatus--, therefor.
Column 10, Line 24, delete "accoridng" and insert --according--, therefor.
Column 10, Line 25, delete "comparision" and insert --comparison--, therefor.
Column 10, Line 26, delete "appartus" and insert --apparatus--, therefor.
Column 10, Line 30, delete "appartus" and insert --apparatus--, therefor.
Column 10, Line 47, delete "wherien" and insert --wherein--, therefor.
Column 10, Line 49, delete "accroding" and insert --according--, therefor.
Column 10, Line 53, delete "wherien" and insert --wherein--, therefor.
Column 10, Line 54, delete "geneating" and insert --generating--, therefor.

Signed and Sealed this
Twentieth Day of October, 2015

Michelle K. Lee
*Director of the United States Patent and Trademark Office*